Dec. 12, 1933.  C. F. SCHULTIS  1,939,141

VALVE

Filed July 22, 1931

INVENTOR.
Charles F. Schultis
BY
Fay, Oberlin & Fay
ATTORNEYS.

Patented Dec. 12, 1933

1,939,141

UNITED STATES PATENT OFFICE 1,939,141

VALVE

Charles F. Schultis, Cleveland, Ohio, assignor to The Royal Brass Mfg. Company, Cleveland, Ohio, a corporation of Ohio Application July 22, 1931. Serial No. 552,404

3 Claims. (Cl. 251—102)

This invention relating, as indicated, to valves has more specific reference to a type of valve construction which is commonly known in the art as a diverter valve. A diverter valve, as is well known, is one which is employed for the purpose of diverting a supplied stream of fluid to either one of several conduits. A notable illustration of this form of construction is found in bathroom installations wherein a valve is employed for the purpose of diverting the water either to the tub or to the shower over the tub.

My invention relates more particularly to the construction of the valve stem and its associated mechanism so that all changes in size of cooperating parts, which may be caused either by wear, change in temperature and the like, will automatically be compensated. Other objects of my invention will appear as the description proceeds.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

In said annexed drawing:—

Figure 1:
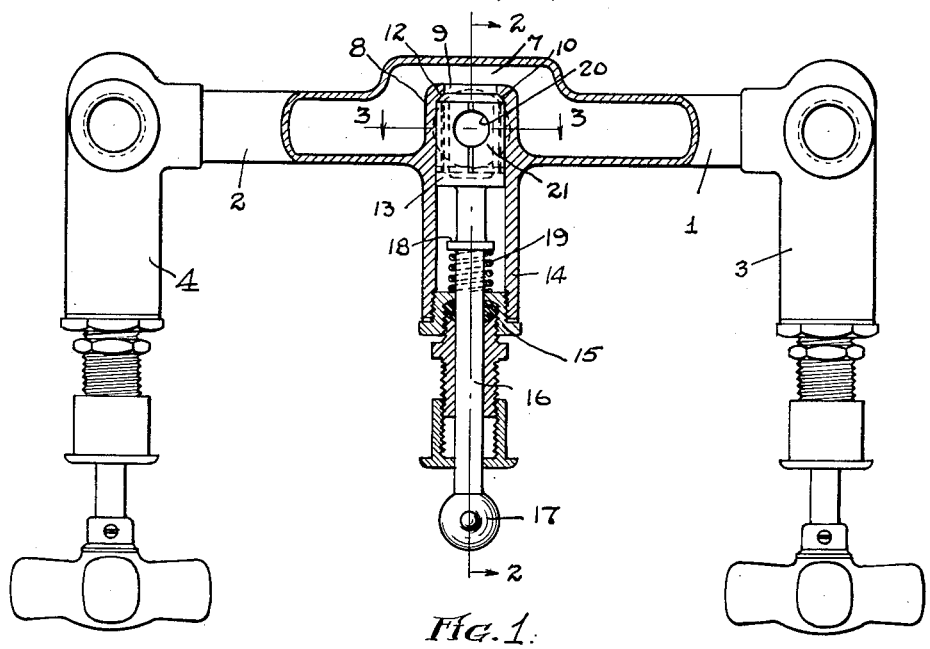
Figure 2:
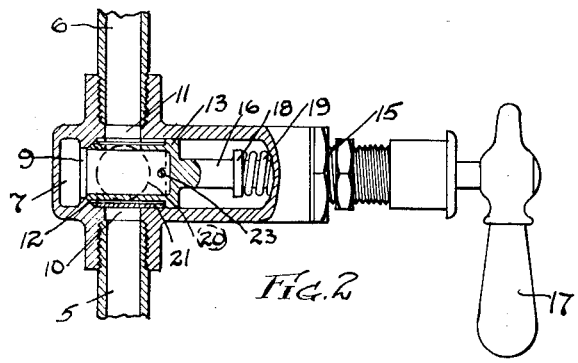
Figure 3:
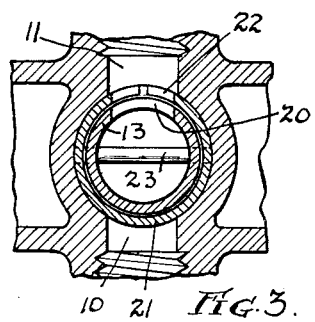
Figure 4:
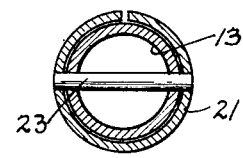
Figure 5:
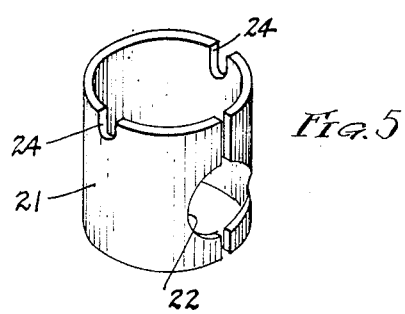

Fig. 1 is an elevational view, partially in section, of the diverter valve comprising my invention and its associated mechanism; Fig. 2 is a transverse sectional view, partially in elevation, of the apparatus illustrated in Fig. 1, taken on the plane substantially indicated by the line 2—2; Fig. 3 is a fragmentary sectional view, drawn to enlarged scale, of that portion of the apparatus illustrated in Fig. 1 taken on the plane indicated by the line 3—3; Fig. 4 is a transverse sectional view taken through the stem of the diverter valve; and Fig. 5 is a perspective view of the resilient sleeve member forming a portion of the valve construction.

Referring now more specifically to the drawing, it will be noted that the valve comprising my invention, and which is presently to be described, is associated with two conduits 1 and 2, which respectively have associated therewith flow control valves 3 and 4. The valves 3 and 4 form no part of this invention and hence will not be described in detail.

Arranged substantially normal to the conduits 1 and 2 and extending in opposite directions are conduits 5 and 6. The valve comprising my invention is designed for the purpose of directing the stream of fluid supplied by the conduits 1 and 2 to either of the conduits 5 and 6. In ordinary bathroom construction the conduit 5 will probably lead to the tub and the conduit 6 to the sprinkler head of the shower.

The conduits 1 and 2 are in communication with a central supply conduit 7, into which extends the boss 8 from which the conduits 5 and 6 emanate. The boss 8 is provided with an inlet orifice 9 and outlet orifices 10 and 11, which outlet orifices respectively are in communication with the delivery conduits 5 and 6. The hollow boss 8 is on its inner periphery, as most clearly illustrated in Figs. 1 and 2, provided with an annular coniform valve seat 12 which is engaged by a complementary valve seat formed on the end of the body 13 of the diverter valve. Associated with the boss 9 is an external tubular projection 14 which is adapted to receive and support the usual stuffing box, generally indicated at 15, through which the stem 16 of the valve projects. The valve stem 16 will of course have a manipulating handle 17 terminally secured thereto.

The valve stem 16 has an annular flange 18 associated therewith and preferably formed integrally therewith, which serves as an abutment for one end of a compression spring 19 which at its other end bears against the inner face of the closure plug forming one part of the stuffing box assembly and accordingly urges the valve body 13 onto the seat 12. The valve body 13, which is secured to the inner terminal of the stem 16, is, as most clearly illustrated in Figs. 2 and 3, substantially tubular in form and provided with a discharge orifice 20 which upon rotation of the valve may be brought into registry with either of the ducts 10 or 11.

Mounted coaxially with the valve body 13 is a split tubular sealing or gasket member 21, preferably of resilient material and provided with an aperture 22 adapted to be in alignment with the orifice 20 in the body 13 of the valve. The resilient gasket member 21 is secured on the body member 13 of the valve by means of a pin such as 23 which extends through the valve and is engaged in slots 24 provided therefor at diametrically opposed points in the gasket.

The operation of the apparatus comprising my invention may be briefly described as follows: The fluid supplied through the conduits 1 and 2 may be regulated by means of the valves 3 and 4 in the well known manner. Depending upon the relationship between the valve body 13 and the conduits 10 and 11, which relationship is adjusted by means of the handle 17, the fluid supplied by the conduits 1 and 2 will be directed to the selected conduit 10 or 11. The action of the spring 19 is to force the stem 16 of the valve axially so that the valve seat on the end of the member 13 is forced into intimate contact with the valve seat 10 so that the fluid supplied will not be permitted to flow around the periphery of the valve body 10. The resiliency of the gasket member 21 forces the same into intimate contact with the inner periphery of the boss 8 so that when the fluid is directed to one of the ducts such as 11, as illustrated in Fig. 3, this gasket member will prevent such fluid from flowing around the valve stem and into the other duct 10. The resiliency of the spring 19, as well as the resilient character of the gasket member 21, compensate for differences in the respective dimensions of the several cooperating parts of the valve assembly so that changes brought about by wear or differences in temperature will in no way affect the operation of the valve. From the drawing and the foregoing description, it is believed that the above described form of construction will be sufficiently clear to those familiar with the art so that a more detailed discussion of the construction and its advantages will not be necessary.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a valve, the combination of a housing having a cylindrical bore and axial and radial ports leading into said bore; a tubular member rotatable in said housing, having axial and radial ports, said member fitting closely within said bore and having a circumferential recess with a gasket member therein, said gasket comprising a resilient outwardly expanding collar rotatable with said member, and having a normal diameter slightly in excess of that of said bore, said gasket acting as a seal for one of said radial ports in said housing and resilient means urging said tubular member axially into engagement with said housing around said axial port therein.

2. In a valve, the combination of a housing having a cylindrical bore with a tubular member rotatably mounted in said bore; said housing having spaced radial ports therein, said member having a radial port and a circumferential recess with an axially split resilient outwardly expanding collar seated in said recess, said collar being rotatable with said member and having a radial port aligned with the radial port in said tubular member, said collar sealing one of the radial ports in said housing when its radial port is aligned with another housing port.

3. In a valve, the combination of a housing having a cylindrical bore and axial and radial ports leading into said bore; a tubular member rotatable in said housing, having axial and radial ports, said member fitting closely within said bore and having a circumferential recess with a gasket member therein, said gasket comprising an auxiliary split resilient outwardly expanding collar rotatable with said member, said gasket acting as a seal for one of said radial ports in said housing and resilient means urging said tubular member axially into engagement with said housing around said axial port therein.

CHARLES F. SCHULTIS